United States Patent [19]

Joseph et al.

[11] Patent Number: 5,787,280

[45] Date of Patent: Jul. 28, 1998

[54] APPARATUS AND METHOD FOR PROVIDING A FACILITY FOR MANAGING VERSIONS AND CONFIGURATIONS OF PERSISTENT AND TRANSIENT OBJECTS

[75] Inventors: Vappala John Joseph, Plano; Mark Benjamin Shadowens, Irving; Craig Warren Thompson; John Chung-Lin Chen, both of Plano, all of Tex.

[73] Assignee: Texas Instruments Incorporated, Dallas, Tex.

[21] Appl. No.: 487,353

[22] Filed: Jun. 7, 1995

Related U.S. Application Data

[62] Division of Ser. No. 62,492, May 14, 1993, abandoned, which is a continuation of Ser. No. 526,215, May 21, 1990, abandoned.

[51] Int. Cl.⁶ .................................................. G06F 17/30
[52] U.S. Cl. .................................... 395/619; 395/712
[58] Field of Search ................................ 395/600, 650, 395/800, 157, 712, 619, 616, 601, 795, 703, 704, 705; 364/200

[56] References Cited

U.S. PATENT DOCUMENTS

| | | | |
|---|---|---|---|
| 4,558,413 | 12/1985 | Schmidt et al. | 364/300 |
| 4,714,992 | 12/1987 | Gladney et al. | 364/200 |
| 4,809,170 | 2/1989 | Leblang et al. | 364/200 |
| 4,853,843 | 8/1989 | Ecklund | 364/200 |
| 4,897,781 | 1/1990 | Chang et al. | 364/200 |
| 4,912,637 | 3/1990 | Sheedy et al. | 364/300 |
| 4,970,639 | 11/1990 | Diefendorf et al. | 364/200 |
| 4,989,132 | 1/1991 | Mellender et al. | 395/705 |
| 5,018,075 | 5/1991 | Ryan et al. | 364/513 |
| 5,047,918 | 9/1991 | Schwartz et al. | 364/200 |
| 5,051,898 | 9/1991 | Wright et al. | 364/200 |
| 5,287,504 | 2/1994 | Carpenter et al. | 395/600 |
| 5,297,250 | 3/1994 | Leroy et al. | 395/157 |
| 5,297,285 | 3/1994 | Abrahamson et al. | 395/712 |
| 5,390,310 | 2/1995 | Welland | 395/400 |
| 5,410,703 | 4/1995 | Nilsson et al. | 395/712 |
| 5,421,012 | 5/1995 | Khoyi et al. | 395/650 |
| 5,428,782 | 6/1995 | White | 395/650 |
| 5,519,874 | 5/1996 | Yamagishi et al. | 395/800 |
| 5,537,529 | 7/1996 | Borovoy et al. | 395/155 |
| 5,645,901 | 7/1997 | Boman | 395/712 |

OTHER PUBLICATIONS

IBM Technical Disclosure Bulletin, vol. 32, No. 10A, Mar. 1990, "AIX Configuration Manager", p. 110, New York, NY.

Mackay, D., et al., "A UNIX-Based System for Software Configuration Management", Computer Journal, vol. 29, No. 6, Dec. 1986, London, pp. 527–530.

Gedye, David, et al., Browsing in the Chip Design Database, University of California at Berkeley, paper dated Nov. 8, 1987.

*Primary Examiner*—Thomas G. Black
*Assistant Examiner*—Frantz Coby
*Attorney, Agent, or Firm*—Robert L. Troike; Tammy L. Williams; Richard L. Donaldson

[57] ABSTRACT

A system (20) and method for managing change in software systems and applications manages change for both transient and persistent objects in a domain independent, non-intrusive, object-oriented fashion. The system (20) and method are designed and implemented as a combination of two abstract machines (22,24) consisting of a set of interface functions (25,26) visible to the application, and an internal or private state (27,28) which is hidden from such application. Applications use the interface functions (25,26) to obtain the services of this change management system (20) and method. Since the internal state of such system (20) and method is outside the application, change management is provided as a service without the need for altering or adding onto application data structures and interfaces.

11 Claims, 2 Drawing Sheets

APPARATUS AND METHOD FOR PROVIDING A FACILITY FOR MANAGING VERSIONS AND CONFIGURATIONS OF PERSISTENT AND TRANSIENT OBJECTS This is a division of application Ser. No. 08/062,492 filed May 14, 1993, now abandoned, which is a continuation of application Ser. No. 07/526,215 filed May 21, 1990 and now abandoned.

Notice

©1990 Texas Instruments Incorporated. A portion of the disclosure of this patent document contains material which is subject to copyright protection. The copyright owner has no objection to the facsimile reproduction by anyone of the patent disclosure, as it appears in the Patents and Trademark Office patent file or record, but otherwise reserves all copyright rights whatsoever.

BACKGROUND OF THE INVENTION

1. Field of the Invention

This invention relates to change management for software systems and applications, and more particularly, a system and method which supports evolution and configuration of objects in a generic, domain-nonspecific, medium-independent fashion.

2. Description of Related Art

Many software and design applications need support for the evolution of objects as well as for constructing and configuring the objects into layered, hierarchical descriptions. Change management may be defined as a consistent set of techniques that aid in evolving the design and implementation of an abstraction. These techniques can be applied at many levels to record history, explore alternatives, and manage layered designs.

The idea of employing abstract machines as a technique for defining systems and designing software is fairly well known in software engineering. Normally, abstract machines are used to specify the design of such systems as hypertext systems or modeling systems. It would, however, be very useful to not only specify and design a system, but also to implement a system, using abstract machines.

In today's software systems, change management is treated as a function which interacts closely with the application. Change management information and domain knowledge are mixed together so that the change management component, if any, is not identifiable as a separate entity. Change management components which are identifiable often interact closely with file systems and only support files as manageable objects. Although several change management systems exist, they only address the needs of the one particular domain to which they are targeted (e.g., Computer Aided Electronic Design, Computer Aided Software Engineering, Authoring Systems etc.).

Current systems implement change management in a domain and application specific manner. This means that the systems are not re-usable and every new application needs to re-implement the same set of techniques in an ad hoc manner. For example, the Berkeley Version Server manages change for Computer Aided Design and Sun Microsystems NSE manages change for software development. Though these systems both run on Sun Microsystems workstations under the Unix operating systems, there cannot be any code sharing because both systems embed knowledge of their domains into the change management software.

Current systems, being tightly bound to the single application environment in which they are embedded, are not robust enough to withstand changes to the environment without major redesign or re-implementation. An example of such change might be a management decision to change the way in which audit trails are kept. The main drawback of such tightly coupled or embedded support systems is that the application semantics now has mixed abstractions. Mixed abstractions lead to software that is difficult to design, implement, validate, and maintain.

Additionally, current systems only support change management of persistent data. Transient data also undergoes change. Therefore, change needs to be managed for both transient and persistent data in a uniform manner.

Presently, systems take the approach that the unit of information which undergoes change is a file. A file is just an artifact of the storage system and often has nothing to do with the objects that an application is concerned with. An object is usually composed of a number of logical units such as design blocks, function definitions, or lines of text. A change management system needs to support all logical units which are meaningful to the application.

SUMMARY OF THE INVENTION

In view of the above problems associated with the related art, it is an object of the present invention to provide a change management system and method which manage the evolution of objects, as well as the construction and configuration of the objects, into layered, hierarchical structures in a manner which is domain independent, application non-specific, and polymorphic with respect to the types and storage classes of objects.

It is another object of the present invention to provide change management as a service provided to clients (applications) by means of a simple interface consisting of programming language functions, requiring no modifications to the data structures of the clients to avail the service.

It is yet another object of the present invention to provide a change management system such that its internal state is hidden from the applications, thereby decoupling the change management system and the applications except for the provided interface.

It is still another object of the present invention to provide a change management system and method such that applications declare domain information to the change management system in a precise, well-defined manner and the change management system makes use of such information without having any knowledge of the domain.

It is a further object of the present invention to provide a policy layer so that as the policies of an organization change, the change management system does not become obsolete.

It is another object of the present invention to manage evolution of transient and persistent objects in a uniform manner, regardless of type or size.

It is yet another object of the present invention to provide external object representations for the internal structures of the system so that import and export to any persistent medium is possible.

In accordance with the above objects of the invention, the preferred embodiment of the present invention is a Change Management Virtual Machine, hereinafter referred to as "CMVM". The implementation of change management as a virtual machine guarantees that it is easy to install and use, and involves minimal perturbation to existing applications. Application data structures need not be aware that their evolution and composition are managed. This contrasts with existing technology where change management is done in an ad hoc, intrusive, high profile manner and change management semantics are mixed in with the application semantics.

A software application uses the published interface of CMVM to obtain change management services. CMVM provides change management services to the application just as a Data Base Management System (DBMS) provides data management services. CMVM creates and manages all data structures necessary for change management as part of its internal state. The applications do not need to access or point to these structures; thereby providing change management without any modification to the data structures or control flow of the application. Clients (applications) tune the global behavior of the CMVM by selecting from a set of policies. Such global policies can be further over-ridden temporarily via arguments specified in the interface functions.

The preferred embodiment of the present invention abstracts the functions associated with managing change, and implements the abstraction as a pure service. This pure service is realized within CMVM as graphs of nodes. The graphs represent the change management structure of an application in terms of versions and configurations. The nodes point at application data using either machine pointers or some other type of identifier. When an application calls the present invention via one of the interface functions, the internal graph structures are updated. If it is required to transform any application data structures, such transformations are performed by the application on behalf of CMVM. CMVM requests such transformations by calling functions which are declared to CMVM during CMVM initialization, as described below.

CMVM initialization consists of sets of declarations. One set of declarations provides to CMVM the type names of the objects which are to be managed, and the names of certain functions which are associated with that type. A typical declaration may state that objects of type document are to be managed and the name of a function for merging documents is document-merge. These functions can then be called by CMVM to transform application data. Such functions always execute in the application space at the request of CMVM. The function names and the type names are kept in the internal state of the CMVM. CMVM operates on user data only through these functions. As a result, the application appears as an abstract machine to CMVM, just as the CMVM appears as an abstract machine to the application. Another set of declarations provide to CMVM the application's selection of change management policies. In the preferred embodiment, there is a fixed set of policies from which an application makes its selections. The policy layer in CMVM allows CMVM to be customized to implement policies of an organization regarding the management of change. For instance, the policies of one organization might dictate that extensive audit trails be kept; whereas another organization may have no need for audit trails.

CMVM is implemented using two orthogonal abstract machines. The Version Abstract Machine manages versions; the Configuration Abstract Machine manages configurations. An applications which needs only one of these services need use only one of these machines. The grouping of the two machines as a virtual machine is purely a functional convenience. The design of CMVM as a combination of abstract machines, orthogonal to each other, is a critical factor in guaranteeing its extensibility.

The function calls to CMVM are done from inside the application code. The end user of the application does not see these calls and, in fact, will be aware of the presence of CMVM only indirectly.

CMVM is polymorphic with respect to the type and storage status of objects managed. Transient and persistent objects are handled in a uniform manner. Type specific information, for example, how to merge objects, is declared to CMVM when an application initializes. CMVM makes no assumption about the underlying persistent storage. Other change management systems (not employing the present invention) restrict themselves to managing persistent objects of predefined types and are usually file-based. These and other features and advantages of the invention will be apparent to those skilled in the art from the following detailed description of a preferred embodiment, taken together with the accompanying drawings in which:

DETAILED DESCRIPTION OF A PREFERRED EMBODIMENT

While considering the below detailed description of the present invention, it should be remembered that any application which requires change management can use CMVM as long as the application is written in a language which can call CMVM interface functions. For example, an application written in Fortran can call CMVM interface functions if the operating environment of the application supports the calling of C or Lisp functions from Fortran. The invention has been implemented in Common Lisp and in C++. Although the preferred embodiment is the C++ implementation described below, it should be understood that the design of the invention can be realized as an implementation in any one of the common programming languages. The Lisp and C++ implementations are identical except for minor syntactic differences of the implementation languages.

Since the present invention is driven by a set of policies and does not need to embed any application specific information, the same machine can be deployed for different applications and different hardware and software platforms. The only requirement is that the client application be able to make function calls to the interface of CMVM. For example, if the present invention is implemented in C or C++, it can manage applications written in Ada if the Ada compiler can call functions written in C.

CMVM according to the preferred embodiment of the present invention consists of two software modules, called abstract machines, to support the management of versions and configurations of objects in applications. The first abstract machine will be referred to as a Version Abstract Machine (VAM) and the second abstract machine will be referred to as a Configuration Abstract Machine (CAM). These abstract machines are software modules which provide an interface to client applications and maintain an internal state analogous to machine instructions and machine state in a hardware machine. The client applications communicate with an abstract machine via the interface. These applications have no knowledge of the data structures of the abstract machine and cannot access its internal state. The abstract machine manages a name space for the client objects that it needs to know about. CMVM keeps all information relating to change management in the internal states of the two machines.

Figure 1:
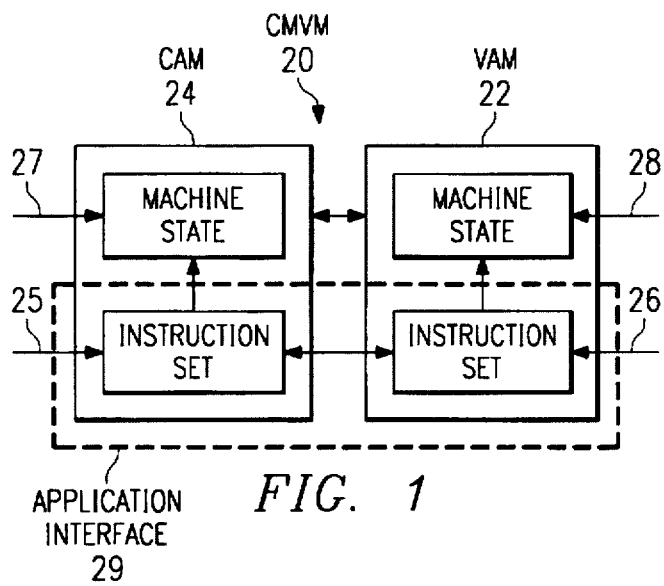
FIG. 1 is a block diagram of the architecture of the present invention as perceived by an application developer.

FIG. 1 illustrates the architecture of CMVM as a combination of VAM and CAM. In FIG. 1, CMVM 20 consists of two abstract machines 22,24. VAM 22 is responsible for managing versions of objects, while CAM 24 is responsible for managing configurations of objects. VAM 22 contains instruction set 26 and machine state 28. Machine state 28 is hidden from the user. Instruction set 26 is a set of functions illustrated as items 100 through 154 in Table 1. Similarly, CAM 24 has an instruction set 25 machine state 27; The instruction sets 25 and 26 of CAM 24 and VAM 22 respectively, which make up the application interface 29, are described later.

Returning to FIG. 1, the bi-directional arrow between the instruction set 26 of VAM 22 and the instruction set 25 of CAM 24 indicates that CAM 24 and VAM 22 communicate with each other using only the instruction sets 25 and 26. The principle of separation of abstractions is strictly adhered to in the architecture of CMVM 20.

Client applications see CMVM 20 as a service. Service requests are made by the client applications using the instruction sets 25 and 26. The clients need only consider how to obtain the services and which services are available; the details of service implementation should be of no concern to the clients. Typically, designers of client applications embed the CMVM 20 instructions in the application code. The end user of an application employing CMVM 20 will not explicitly be aware of the presence of CMVM 20 except through added functionality. CMVM 20 instructions get executed as a result of user commands written in the terminology of the application domain. For example, a text editor may want to keep past versions of a file for legal, security, or historical reasons, and to guard against media failures. It may also be necessary to manage alternate evolution paths if the file is edited by multiple persons. The editor implementor calls CMVM 20 at the appropriate places inside the software implementing the editor. When an end user gives a Save File command, for example, the creation of versions and their proper placement in the evolution path are provided to the editor as a service. The actions are transparent to the user.

Figure 2:
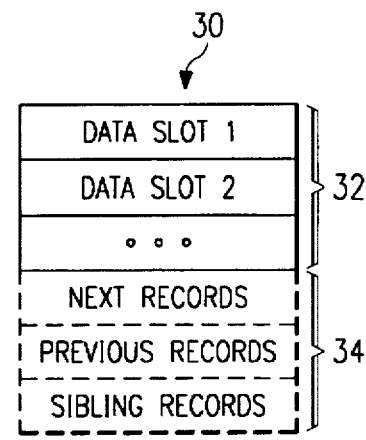
FIG. 2 is a block diagram depicting a traditional architecture of a change management system where the change management data structures are bound into the application data structures.

The approach in the present invention of providing change management as a service detached from the application contrasts with the existing approach illustrated in FIG. 2. In the existing approach (not employing the present invention), change management structure is bundled with application structure, and change management data is not isolated from the application data. The application entity 30 manages application data 32 and change management data 34. An obvious defect of this approach is that change management cannot be implemented in existing applications without major redesign of data structures and major revamping of application code. It is also difficult to disable change management services selectively. But the major drawback is that the same facility is re-implemented in every application, mostly by developers who do not have any special knowledge of change management as an orthogonal semantic unit.

Figure 3:
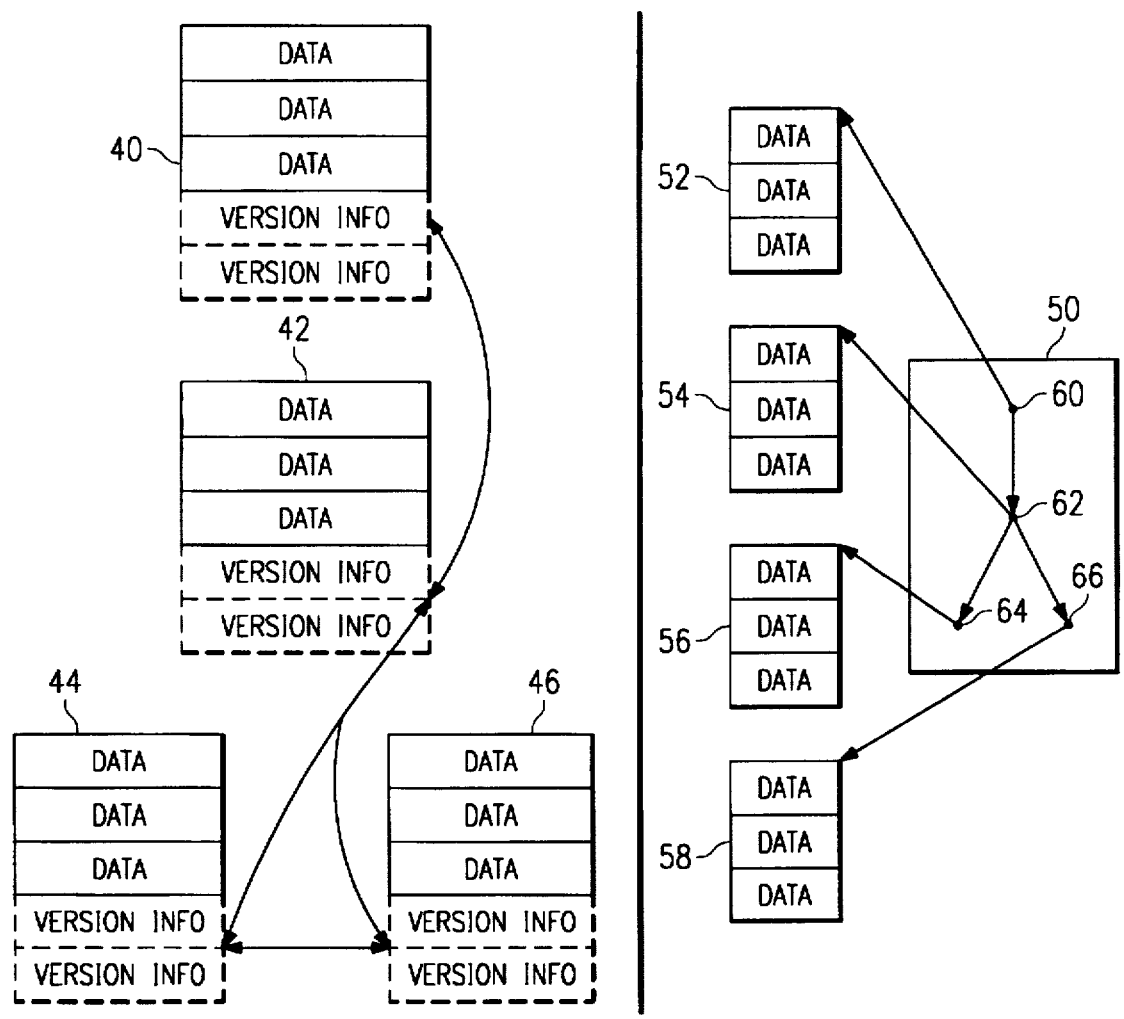
FIG. 3 is a block diagram contrasting the traditional approaches to change management with that of the present invention.

The approach of the present invention is contrasted with the current approach in FIG. 3. The left half of FIG. 3 shows how application entities 40, 42, 44, and 46 (each of which is an instance of application entity 30 in FIG. 2) are related in a version hierarchy employed by existing systems. This version hierarchy only confuses the application semantics and should be detached from the application. The right half of FIG. 3 illustrates how the detaching of version structure from application semantics is accomplished in the present invention. Version structure 50 has been detached from the application. Version structure 50, consisting of items 60, 62, 64, and 66, now stays in the private state of CMVM 20. Removing the change management structure from the application structure simplifies the application. This achieves an important objective by not modifying application data structures to provide change management service. By comparing FIG. 3 with FIG. 2, a modification can be seen; namely change management data 34 has been eliminated from application entity 30 and instead resides in nodes of the version structure 50. This effectively decouples change management from the application.

The preferred embodiment of the present invention, CMVM 20, treats versioning based on temporal, non-temporal, or qualitative aspects of objects uniformly, as opposed to traditional change management systems that managed only temporal evolution. Therefore, VAM 22 provides support for the evolution of objects. VAM 22 supports linear and branching histories as well as the merging of histories. Histories may be based on non-temporal, or even non-quantitative, attributes in the application domain. For example, in a circuit design domain, chips may have histories based on performance as Fast chip, Faster chip, etc.. In the same domain, entire designs may evolve based on a confidence level as Completed Design, Validated Design, Tested Design, etc.. In the usual case of histories based on time, VAM 22 supports time stamps, baselining, and major/minor/experimental versions. An Undo facility provides for "what if" experimentation. VAM 22 provides for facilities to specify how objects are to be merged and how differential versions are to be derived.

VAM 22 distinguishes one of the multiple versions of a node as a primary version. Each node knows about its primary version and other alternate versions as well as the versions from which it was derived. This kind of knowledge, together with an internal system identifier assigned to each node in a graph, are used to validate and execute user requests to add/delete/merge/modify versions.

Figure 4:
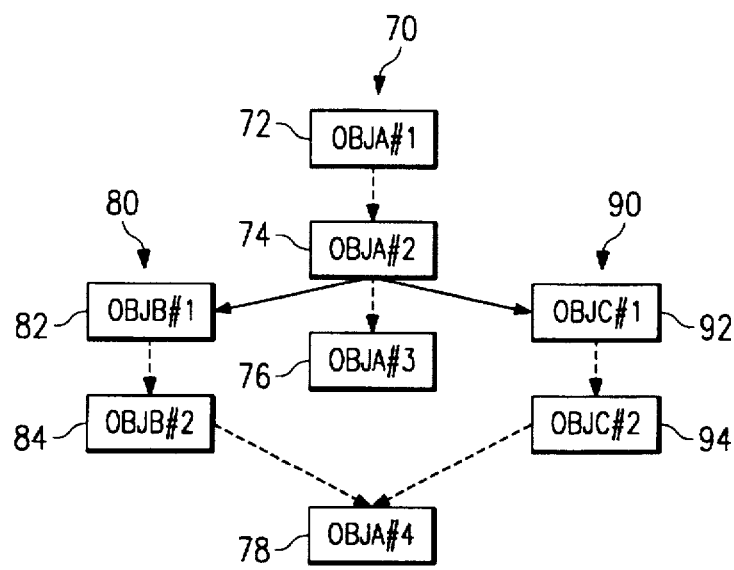
FIG. 4 is a block diagram of the primary internal data structure of the Version Abstract Machine of the preferred embodiment of the present invention.

The main data structure of VAM 22 is a graph of nodes where each node models one version of an object; there is one graph for each object that is versioned. FIG. 4 is a block diagram of one such graph according to the preferred embodiment of the present invention. The entire structure is referred to as a version graph 70. Items 72–94 are the nodes of version graph 70. An arrow from node A to node B indicates that B represents an object which is a version of the object represented by A. When an application requests the services of VAM 22 (not specifically shown) via the instruction set 26, the graph gets updated in the machine state 28 of VAM 22. The machine state 28 of VAM 22 consists primarily of a collection of such graphs, organized into a hash table. Other data structures in machine state 28 manage a name space, described below.

One of the main problems in bringing together modules which co-operate to provide the full functionality of the application is the exchange of data. CMVM 20 addresses this problem by requiring that all data access takes place indirectly through character string names representing data structures of primitive data types such as numbers. VAM 22 and CAM 24 manage name spaces to map machine states 28 and 27 respectively into character string names. In the preferred embodiment, this name space is implemented as a collection of multi-level hash tables.

A stack structure is used for supporting an "Undo" operation. Various container structures such as lists and tables are used to manage the data efficiently. These structures are not fundamental to the operation of VAM 22 and will not be discussed further herein.

FIG. 4 shows version graph 70 after the object in 72 has undergone a series of evolutions. There are several combinations of instructions from instruction set 26 which could have given rise to FIG. 4. It can be seen that version graph 70 has a tree structure except when nodes are merged. When nodes are merged, for example merged node 78 in FIG. 4, the merged node becomes a version of all the nodes from which it is merged.

Each version node points to an application object using an untyped pointer or a non-pointer identifier if the object is in memory and by a non-pointer identifier if the object is in a persistent store. In the presence of only linear versioning, the graph disintegrates to a linear structure; in the presence of branching versions the graph is a tree. It is the ability to merge versions that gives rise to a graph structure. When two version nodes are merged, for example merged node 78, the merged node is inserted as a version of the nodes from which it is merged, namely nodes 84, 76, and 94. The object that the merged node points to is obtained from the application by calling a merge function supplied by the application during initialization.

VAM 22 is driven by its instructions. The instructions are embedded in client applications. If the embedded instructions are extracted from an application, the resulting set of instructions constitutes a program for VAM 22. A VAM 22 program has the following basic control flow:

1. Initialize VAM 22 by selecting policies.
2. Declare to VAM 22 the names of the types of objects to be managed and any function arguments to be associated with such types.
3. For each object that is to be versioned, execute the instruction Create Version Graph 100. This tells VAM 22 to start versioning the object.
4. A version of an object is created by first creating a version (Create Version Node 102) and then installing the version (Install Version 104).
5. Steps 3 and 4 are repeated to build up the machine state 28 of VAM 22.
6. Any function in the instruction set 26 may be called at any time. If the service requested by such function cannot be performed, a return code indicating failure is returned to the client which requested the service.
7. When the application terminates, the machine state 28 of VAM 22 is saved into a persistent store via instruction Export To 152.
8. When the application restarts, VAM 22 can be brought into the state at last termination via instruction Import From 154.

The preferred embodiment of the present invention, CMVM 20, has adequate, flexible support for granularity and layered composition. Abstract, concrete and dynamic configurations provide for a highly flexible, tunable, comprehensive management of compositions. Configuration Abstract Machine (CAM) 24 provides support for layered or hierarchically structured objects. A configuration is the specification of the composition of an object. For example, a book consists of chapters which consist of sections which consists of paragraphs whereas a software system consists of modules which consist of functions which consist of statements. Likewise, CAM 24 supports the composition of objects into general graphs which need not be acyclic. The configurations that CAM 24 supports may be abstract, concrete, or dynamic. An abstract configuration is a composition of generic objects (a book which has three chapters); a concrete configuration (a release) is made up of specific versions of components, and a dynamic configuration is a constrained configuration with unresolved bindings. An example of a dynamic configuration is a software release specified as most recent.

Figure 5:
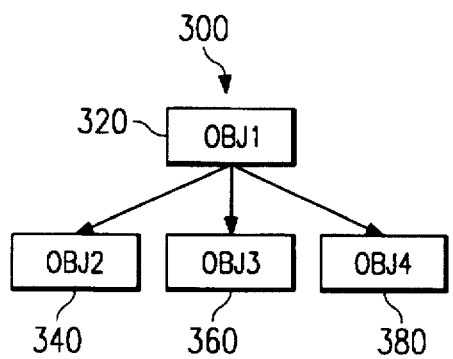
FIG. 5 is a block diagram of the primary internal data structure of the Configuration Abstract Machine of the preferred embodiment of the present invention.

The main data structure of CAM 24 is a graph of nodes where each node models either the object conceptually as a whole, called a supercomponent, or a distinguishable portion or subcomponent of the object. FIG. 5 is a drawing of one such graph. The entire structure, 300, is referred to as a configuration graph. Items 320, 340, 360, and 380 are configuration nodes of the graph 300. An arrow from node A to node B indicates that configuration node B is a subcomponent of configuration node A. Likewise, it also indicates that configuration node A is a supercomponent of configuration node B. The supercomponent, 320, is the root node of the graph. The subcomponents, 340, 360, and 380, are the leaf nodes of the graph. It is important to note that while 340, 360 and 380 are the leaf nodes of the graph 300, they may represents objects themselves that are also decomposable. They may be supercomponents or root-nodes of other configuration graphs.

Figure 6:
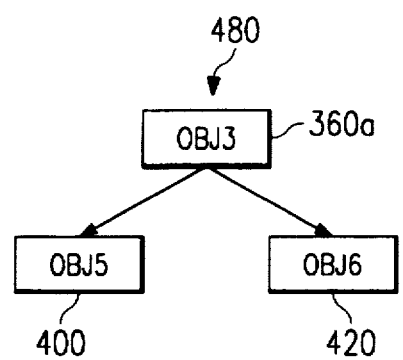
FIG. 6 is a block diagram of the primary internal data structure of the Configuration Abstract Machine showing a configuration graph for a node seen in FIG. 5.

Looking now at FIG. 6, a drawing of the configuration graph for leaf node 360 of FIG. 5 is seen. Graph 480 has one supercomponent, 360a, and two subcomponents 400 and 420. Item 360 (FIG. 5) and 360a (FIG. 6) represent the same object. When an application requests the services of CAM 24 via the instruction set 25, configuration graphs such as 480 get updated in the machine state 27 of CAM 24. The machine state 27 of CAM 24 consists primarily of a collection of these configuration graphs organized into a hash table. Other data structures in the machine state 27 manage a name space exactly like the one described for VAM 22. It is important to note that although these name spaces are identical in design and implementation, they are locally and separately defined for each of the machines VAM 22 and CAM 24. Also like the VAM 22, the CAM 24 maintains a stack structure for supporting an "Undo" operation. Various container structures such as lists and tables are used to manage the data efficiently. These structures are not fundamental to the operation of CAM 24 and will not be discussed further herein.

Each configuration node points to an application object using an untyped pointer or a non-pointer identifier if the object is in memory, or by a non-pointer identifier if the object is in a persistent store.

In order to achieve the full functionality supported by CAM 24, it is necessary for CAM 24 to coordinate its activities with VAM 22. This is accomplished by making service requests of VAM 22 in the same manner that an application would, and by the ability of configuration nodes to use non-pointer identifiers for referencing objects. This activity is most prevalent in CAM 24's ability to represent and manage abstract configurations, concrete configurations, and dynamic configurations.

Figure 7:
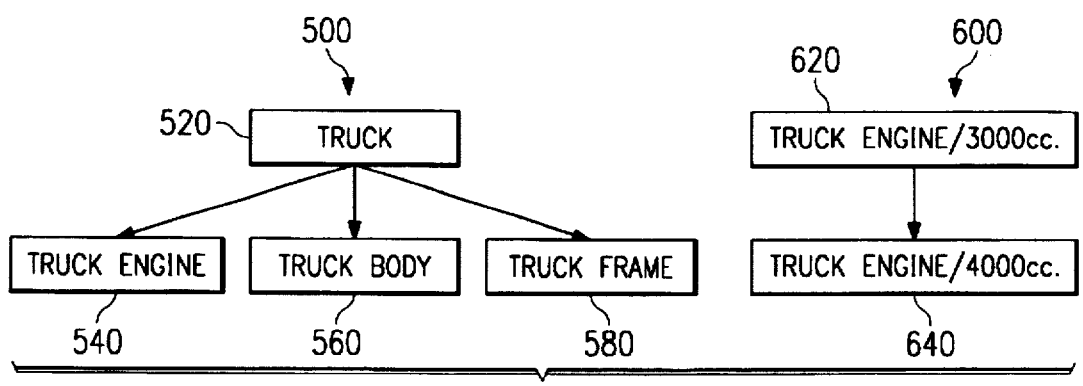
FIG. 7 is a block diagram of an example configuration graph and a related version graph.

As mentioned previously, VAM 22 supports objects evolved over time or over other attributes. CAM 24 supports objects as subcomponents of other objects. It must therefore be necessary to support objects whose subcomponents evolve. An abstract configuration is a configuration of an object whose subcomponents have versions. For example, a Truck could be composed of subcomponent objects Truck Engine, Truck Body, and Truck Frame. However, there may be two versions of Truck Engine: Truck Engine/3000cc, and Truck Engine/4000cc. FIG. 7 is a drawing of this example. Configuration graph 500 represents the Truck configuration. Version graph 600 represents the versions of the Truck Engine. In the abstract configuration of Truck, the data value associated with Truck Engine would be the Truck Engine version graph 600. Both versions, Truck Engine/3000cc, 620 and Truck Engine/4000cc, 640 are available for use but neither has been selected. For an abstract configuration of Truck configuration graph 500, the machine state 27 of CAM 24 will have for the value of Truck Engine configuration node 540, the name of the Truck Engine version graph 600. In this instance, the Truck Engine version graph 600 name serves as a non-pointer identifier for the Truck Engine version graph 600 (transient) in memory. CAM 24 will obtain the name of the Truck Engine version graph 600 by issuing the service request Create Version Graph 100 or Return Current Graph 120 to VAM 22.

A concrete configuration is a configuration of an object whose subcomponents evolve and a specific version of each subcomponent has been chosen. In the example of FIG. 7, one concrete configuration of Truck 500, would have the data value associated with Truck Engine be the Truck Engine/3000cc. version node 620 of Truck Engine version graph 600. For the concrete configuration of Truck configuration graph 500, the machine state 27 of CAM 24 will have for the value of Truck Engine configuration node 540, the name of the Truck Engine version graph 600 and the name of the Truck Engine/3000cc. version node 620. Similar to the abstract example, the Truck Engine version graph 600 name and the Truck Engine/3000cc. version node 620 name serve as a non-pointer identifier for the specific Truck Engine version node in memory. CAM 24 will obtain the name of the Truck Engine version graph 600 and the name of the Truck Engine/3000cc. version node 620 by issuing the service requests Create Version Graph 100 or Return Current Graph 120, and Return Root Version 116 or Return Current Version 122 to VAM 22.

A dynamic configuration is a configuration of an object whose subcomponents evolve and the selection of a specific version of each subcomponent are based upon the machine states 27 and 28 of CAM 24 and VAM 22 respectively when the service request for a dynamic configuration is made. In the example of FIG. 7, an application could request that a configuration of Truck 500 be generated such that it contains "The Largest Engine". CAM 24 can process such a request by making use of a search function defined by the application which, given Truck Engine version graph 600, would examine each of its version nodes and determine which version node represented "The Largest Engine". CAM 24 would then associate this version node with Truck Engine configuration node 540 of Truck configuration graph 500. The reason why this is a dynamic configuration is that although currently, "The Largest Engine" is Truck Engine/4000cc. version node 640, another version of Truck Engine/3000cc. version node 620 could be created-Truck Engine/4500cc.-as a sibling to Truck Engine/4000cc. version node 640. After the creation of such a version node, the service request for a dynamic configuration of Truck 500 based upon "The Largest Engine" would yield Truck Engine/4500cc. as the value associated with Truck Engine configuration node 540 of Truck configuration graph 500 due to the change in machine state 28 of VAM 22. For either case, for a dynamic configuration of Truck configuration graph 500, the machine state 27 of CAM 24 will have for the value of Truck Engine configuration node 540, the name of the Truck Engine version graph 600 and the name of the Truck Engine version node selected by the application defined function. Similar to the abstract and the concrete examples, the Truck Engine version graph 600 name and the name of the Truck Engine version node selected serve as a non-pointer identifier for the specific Truck Engine version node in memory. CAM 24 will obtain the name of the Truck Engine version graph 600 by issuing the service request Return Current Graph 120. Service requests Return Version Graph 102, Return Root Version 116, Return Current Version 122 and Find Versions By Attribute 132 to VAM 22 are available for use in the application-defined search function for determining the name of the Truck Engine version node to be selected. Further details of the CAM 24 services will appear in the description of the instruction set 25 of the CAM 24 discussed below.

CAM 24 is driven by its instructions. The instructions are embedded in client applications. If the embedded instructions are extracted from an application, the resulting set of instructions constitutes a program for CAM 24. A CAM 24 program has the following basic control flow:

1. Initialize CAM 24 by selecting policies.
2. Declare to CAM 24 the names of the types of objects to be managed and any function arguments to be associated with such types.
3. For each object that is to be configured, execute the instruction Create Configuration Node 200. This tells CAM 24 to initialize a configuration graph for the object by first creating a configuration node.
4. A subcomponent of an object is established by following Step 3 for each subcomponent and then installing the subcomponents (Install Configuration Nodes 202) as leaf nodes of root configuration node.
5. Steps 3 and 4 are repeated to build up the machine state 27 of CAM 24.
6. Any function in the instruction set may be called at any time. If the service requested by such function cannot be performed, a return code indicating failure is returned to the client which requested the service.
7. When the application terminates, the machine state 27 of CAM 24 is saved into a persistent store via instruction Export To 220.
8. When the application restarts, CAM 24 can be brought into the state at last termination via instruction Import From 222.

The CMVM 20 abstract machines have no knowledge of the type of operations on the application objects. The fact that change can be managed without having access to application semantics is a key factor in maintaining the generic nature and therefore the value of the present invention. Any application-specific information is managed outside the present invention by means of functions defined by the application such as the merge function. As part of initializing the abstract machines, the type names of objects are declared to the machines as well as the names of functions associated with that type. (It should be noted that these names are merely character strings to the abstract machines with no meaning attached to them except that they name types or functions.) For example, a declaration will say that Cell is a type and it has an associated merge function called Merge Cells. When two versions Cell1 and Cell2 are to be merged, the VAM 22 calls the function MergeCells which merges the two objects in some domain specific manner and returns a pointer to the merged object. This object is then pointed to by the node which is the merge of the two nodes modeling Cell1 and Cell2. The same technique is followed for deriving differential versions, printing information about objects, etc. Further details of this appear in the description of the instruction sets 26 and 25 of the VAM 22 and CAM 24 respectively given below.

The instruction sets 26 and 25 of VAM 22 and CAM 24 respectively, are collections of functions. The functions take arguments which are of type integer, character string, Boolean, or an untyped pointer. Restricting the argument types in this way ensures that CMVM 20 does not need to deal with typed data belonging to the application. Also, most programming languages support such primitive data types thus enabling applications written in most programming languages to make use of CMVM 20 via inter-language calls.

VAM 22 has a context called current graph and each graph has a context called current_node. Many of the functions in the instruction set 26 take an argument called Gname which is a character string. If this is optional and not specified, VAM 22 uses the graph which is known to it as the current_graph. Similarly, if an optional version_name defaults, VAM 22 uses current_node. Current_node and current_graph are reset by various VAM 22 operations. They can also be reset by appropriate functions described below. Furthermore, one can query for the current settings of current_node and current_graph by using functions provided below.

When a VAM 22 interface function returns an aggregate data structure (lists or arrays), the items in the structure are ordered chronologically.

TABLE 1

| 160 | 162 | 164 | 166 | |
|---|---|---|---|---|
| Create Version Graph | Gname | Nil | Gname | 100 |
| Create Version Node | Object, Gname | Vname | Vname | 102 |
| Install Version | Vname, Gname | Parent, Primary-p | Boolean | 104 |
| Delete Version | Vname | Gname | Boolean | 106 |
| Merge Versions | Vname1, Vname2 | Gname, Merged-Name | Merged-Name | 108 |
| Set Current Version | Vname | Gname | Boolean | 110 |
| Set Version Attribute | String, Vname | Gname | Boolean | 112 |
| Set Current Graph | Gname | Nil | Boolean | 114 |
| Return Root Version | Nil | Gname | Vname | 116 |
| Versions With Value | Value | Gname | List-Of-Names | 118 |
| Return Current Graph | Nil | Nil | Gname | 120 |
| Return Current Version | Nil | Gname | Vname | 122 |
| Describe Node and Value | Vname | Gname | Void | 124 |
| Describe Version Graph | Nil | Gname | Void | 126 |
| Describe Version Node | Vname | Gname | Void | 128 |
| All Your Versions | Vname | Gname | List-Of-Names | 130 |
| Find Versions By Attribute | String | Gname | List-Of-Names | 132 |
| Version Time | Vname | Gname | Time-String | 134 |

TABLE 1-continued

| 160 | 162 | 164 | 166 | |
|---|---|---|---|---|
| Return Child Versions | Vname | Gname | List-Of-Vnames | 136 |
| Return Parent Versions | Vname | Gname | List-Of-Vnames | 138 |
| Return Primary Version | Vname | Gname | Vname | 140 |
| There Exists Version | Vname | Gname | Boolean | 142 |
| List All Version Graphs | Nil | Nil | List-Of-Graphs | 144 |
| Browse Version Graph | Gname | Nil | Void | 146 |
| Return Version Object | Vname | Gname | Object | 148 |
| Undo Last | Nil | Nil | Void | 150 |
| Export To | Version-Machine | Nil | External-Form | 152 |
| Import From | External-Form | Nil | Version-Machine | 154 |

If a pointer value is returned by an interface function, the application should check that the pointer is not NULL. A NULL value is a return code meaning that VAM 22 failed to perform the requested service. If a Boolean value (TRUE, FALSE) is returned by an interface function, the application should check that the value is not FALSE. A FALSE value is a return code meaning that VAM 22 failed to perform the requested service.

Create Version Graph 100 creates and returns a version graph. This is the first call made to Version Abstract machine to start versioning an object.
Create Version Node 102 creates and returns a version node.
Install Version 104 installs a version node into an existing version graph.
Delete Version 106 deletes an existing version node.
Merge Versions 108 merges two version nodes. The merging of the objects that the nodes address is done by the application. The merged node is installed as a version of the two nodes from which it is merged.
Set Current Version 110 sets the current version.
Set Version Attribute 112 sets an attribute of the version which is typically a user specified time stamp.
Set Current Graph 114 sets the current graph.
Return Root Version 116 returns the root version.
Versions With Value 118 returns all the versions with a given value.
Return Current Graph 120 returns the current graph.
Return Current Version 122 returns the current version.
Describe Node And Value 124 describes the version node and its value in some form specified by the user.
Describe Version Graph 126 describes the version graph basically as a mathematical graph.
Describe Version Node 128 describes the version node by listing parents, children, and siblings with no indication of the version node's value.
All Your Versions 130 gives a linear list of all versions of a node.
Find Versions By Attribute 132 finds all version nodes with a given value for a certain attribute. This function is typically used to find all versions with a certain time stamp.
Version Time 134 returns the time that the user associated with this node, if any. If there is no user specified time attribute, a system time is returned.
Return Child Versions 136 return all immediate children of a node.
Return Parent Versions 138 returns all immediate parents of a node.

Return Primary Version 140 returns the primary version of a node.

There Exists Version 142 returns true or false as appropriate.

List All Version Graphs 144 returns a list of all the version graphs known to VAM 22. Note that there is one graph for each object being versioned.

Browse Version Graph 146 browses a version graph using a browser known to VAM 22 assuming that there is a graph browsing facility available in the language used to implement the present invention. If there is no such browser, a text description of the graph is given.

Return Version Object 148 returns the value of a version node.

Undo Last 150 undoes the last operation.

Export To 152 writes out a linearized version of the machine or a graph that is suitable for writing to a disk, such as an array, for example.

Import From 154 is the opposite of Export To 152.

The following is the instruction set 25 for CAM 24. Many of the functions below take arguments called Node, Root-Node or Parent-Node which are character strings.

When an interface function returns an aggregate data structure (lists or arrays), the items in the structure are ordered in the same order that they were inserted.

TABLE 2

| 230 | 232 | 234 | 236 | |
|---|---|---|---|---|
| Create Configuration Node | Object, Cname | Cdesc | Node | 200 |
| Install Configuration Nodes | List-Of-Nodes, Parent-Node | Nil | Parent-Node | 202 |
| Delete Configuration Node | Node, Patent-Node | Nil | Node | 204 |
| Undo Last Operation | Nil | Nil | Boolean | 206 |
| Return Children of Configuration Node | Node | Nil | List-Of-Nodes | 208 |
| Return Parents of Configuration Node | Node | Nil | List-Of-Nodes | 210 |
| Return Parameterized Configuration | Node, Node-Function | Nil | Root-Node | 212 |
| Describe Configuration | Node | Nil | String | 214 |
| Find Configuration By Description | String | Nil | List-Of-Nodes | 216 |
| Browse Configuration | Root-Node | Nil | Void | 218 |
| Export To | Machine | Nil | External-Form | 220 |
| Import From | External-Form | Nil | Machine | 222 |

Create Configuration Node 200 creates and returns a configuration node.

Install Configuration Nodes 202 installs a set of configuration nodes as the subcomponents of a supercomponent configuration node.

Delete Configuration Node 204 deletes the configuration graph rooted at the specified configuration node from its supercomponent configuration nodes.

Undo Last Operation 206 undoes the last operation.

Return Children of Configuration Node 208 returns the current set of configuration nodes that are the subcomponents of the current configuration node.

Return Parents of Configuration Node 210 returns the current set of configuration nodes that are the supercomponents of the current configuration node.

Return Parameterized Configuration Graph 212 returns a new configuration node rooted at the same configuration graph as the current configuration node but whose subcomponents configuration nodes are determined by a specification function.

Describe Configuration Graph 214 describes the configuration graph rooted at the current configuration node.

Find Configuration Graph by Description 216 finds all configuration nodes rooted at configuration graphs whose descriptions match the given description.

Browse Configuration Graph 218 browses a configuration graph using a browser known to the CAM 24 assuming that there is a graph browsing facility available in the language used to implement the present invention. If there is no such browser, a text description of the graph is given.

Export To 220 writes out a linearized version of the machine or a graph that is suitable for writing to a disk, such as an array, for example.

Import From 222 is the opposite of Export To 220.

All application entities in VAM 22 and CAM 24 are named and the interface functions use these names to refer to such entities. The graphs of VAM 22 are collected into a hash table keyed on the names of the graphs.

Different user-selected policies regarding how an application manages change can be established in CMVM 20. CMVM 20 treats such policies as an abstraction and designs them as a layer to which CMVM 20 interfaces. These policies are concerned with items such as authorization, audit trails, baselining, mutability of objects, number of versions, and support for granularity. A default set of policies is provided so that CMVM 20 can be used when no policy declarations are specified. Additional policies are declared using an IMPLEMENT macro which is typically invoked from inside the code which initializes the application. The names of the functions which CMVM 20 uses to interface to application data are also passed to CMVM 20 during this initialization process. An example of such a passed function is a merge function which takes two application objects and returns an application object which is the "merge" of the two objects. Clearly the "merge" requires domain specific information and executes in the application's workspace.

Client applications obtain the services of CMVM 20 by embedding function calls to VAM 22 and CAM 24 in the application software. In the preferred embodiment of the present invention, CMVM 20 consists of two libraries of software and two C header files corresponding to VAM 22 and CAM 24 respectively. Applications include the header files into the application software. The libraries are specified in the library search path of the application. This results in the linking in of CMVM 20 into the application load module. It is possible for an application to use only VAM 22; in this case only the header file for VAM 22 and the library for VAM 22 are involved in building the application load module. CAM 24 uses VAM 22 to manage dynamic configurations; therefore, if the CAM 24 header file and library are specified, the VAM 22 header file is automatically included and the VAM 22 library is automatically linked in.

In the preferred embodiment of the present invention, CMVM 20 and the application using CMVM 20 run in the same address space. However, since the CMVM 20 interface consists of functions with primitive data type arguments, the service requests can be remote procedure calls if the operating environment supports remote procedure calls (for example, Sun Microsystems workstations under Unix). When CMVM 20 runs remotely, the nodes of VAM 22 and CAM 24 will use object identifiers to access and return application entities.

While a specific embodiment of the invention has been shown and described, various modifications and alternate embodiments will occur to those skilled in the art. Accordingly, it is intended that the invention be limited only in terms of the appended claims.

We claim:

1. A method for managing change in an application wherein how the change is being managed remains transparent to a user comprising the steps of:

inputting domain specific information as function parameters as well as object type information to an abstract machine via an interface;

initializing policies selected by said user within said abstract machine;

storing change management data structures in a private state of said abstract machine in response to a service request by said application, wherein said data structures are managed in a generic application-nondependent fashion;

managing a name space which includes at least one name;

communicating with said application using only said at least one name;

automatically updating said stored change management data structures in response to said service request; and returning information to said application using un-typed pointer structures together with said names.

2. The method for managing change in an application of claim 1, wherein said storing step further comprises the steps of:

creating said change management data structures when an initial request is made to manage change for an object; and storing said created change management data structures in said private state of said abstract machine in response to said creating step.

3. The method for managing change in an application of claim 1, wherein said managing step further comprises ensuring that said service request only requires primitive data objects as arguments.

4. The method for managing change in an application of claim 1, wherein said returning step includes the step of returning said information only using primitive data objects as arguments.

5. The method for managing change in an application of claim 1, wherein after said step of communicating and before said step of updating, if said abstract machine requires more information from said application, further comprising the steps of:

looking up said function parameters, if any are required, within said private state of said abstract machine;

said abstract machine requesting from said application at least one function bearing said at least one name to be executed in a workspace of said application depending upon said service request; and obtaining said domain specific information in response to said requesting step.

6. The method for managing change in an application of claim 1, wherein said step of inputting further comprising inputting policy declarations, wherein said policy declarations further adjust behavior of said abstract machine.

7. A system for providing change management for persistent and transient objects of all types, comprising:

an abstract machine for receiving inputted domain specific information as function parameters as well as object type information from an application program via an interface, and for initializing policies selected by a user within said abstract machine;

a data structures storage apparatus residing in a private state of said abstract machine, for storing change management data structures resulting from a requested service, wherein said data structures are managed in a generic application-independent fashion;

a name space manager residing within said abstract machine, wherein said name space includes at least one name to be used for communicating with said application program;

an apparatus for returning information to said application program using identifying structures together with said at least one name; and a service requester within said interface for requesting services of said abstract machine by said application program.

8. The system for providing change management for persistent and transient objects of claim 7, wherein said data structures storage apparatus includes a data structures automated updator for updating said stored change management data structures in response to said requested service.

9. The system for providing change management for persistent and transient objects of claim 7, wherein said identifying structures include un-typed pointers when said returned information involves said transient objects.

10. The system for providing change management for persistent and transient objects of claim 7, wherein said identifying structures include non-pointer identifiers when said returned information involves said transient objects.

11. The system for providing change management for persistent and transient objects of claim 7, wherein said identifying structures include non-pointer identifiers when said returned information involves said persistent objects.

* * * * *